(12) United States Patent
Agranov et al.

(10) Patent No.: US 7,417,677 B2
(45) Date of Patent: Aug. 26, 2008

(54) LAG CANCELLATION IN CMOS IMAGE SENSORS

(75) Inventors: Gennadiy A. Agranov, Sunland, CA (US); Dmitri Jerdev, South Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 921 days.

(21) Appl. No.: 10/636,534

(22) Filed: Aug. 8, 2003

(65) Prior Publication Data

US 2005/0030402 A1      Feb. 10, 2005

(51) Int. Cl.
*H04N 5/335* (2006.01)
*H04N 5/217* (2006.01)

(52) U.S. Cl. ...................... 348/308; 348/241

(58) Field of Classification Search ................ 348/308, 348/313, 312, 314, 241, 243
See application file for complete search history.

(56) References Cited

U.S. PATENT DOCUMENTS

| | | | | |
|---|---|---|---|---|
| 5,471,515 | A * | 11/1995 | Fossum et al. ................ | 377/60 |
| 6,177,333 | B1 * | 1/2001 | Rhodes ........................ | 438/433 |
| 6,204,524 | B1 * | 3/2001 | Rhodes ........................ | 257/222 |
| 6,379,013 | B1 * | 4/2002 | Bechtel et al. ............... | 359/604 |
| 6,424,375 | B1 | 7/2002 | Fowler | |
| 6,727,946 | B1 * | 4/2004 | Zhao et al. ................... | 348/308 |

OTHER PUBLICATIONS

Nixon et al, "256+256 CMOS Active Pixel Sensor Camera-on-a-Chip", IEEE Journal of Solid-State Circuits, vol. 31(12), pp. 2046-2050, 1996.*
Mendis et al, "CMOS Active Pixel Image Sensors", IEEE Transactions on Electron Devices, vol. 41(3), pp. 452-453, 1994.*
B. Pain et al.—"Analysis and enhancement of low-light-level performance of photodiode-type CMOS active pixel imagers operated with sub-threshold reset,"0 IEEE Workshop of CCDs and AIS, Nagano, Japan, Jun. 1999, pp. 140-143.
H. Tian et al.—"Analysis of Temporal Noise in CMOS Photodiode Active Pixel Sensor," IEEE Journal of Solid-State Circuits, vol. 36, No. 1, Jan. 2001, pp. 92-101.

* cited by examiner

*Primary Examiner*—Lin Ye
*Assistant Examiner*—Nicholas G. Giles
(74) *Attorney, Agent, or Firm*—Dickstein Shapiro LLP

(57) ABSTRACT

A pixel cell with improved lag characteristics without increased noise. The pixel cell according to embodiments of the invention includes a photo-conversion device and a floating diffusion region switchably coupled to the photo-conversion device. The pixel cell includes a reset transistor, which has a first terminal electrically connected to the floating diffusion region and a second terminal switchably coupled to first and second voltage sources. The first voltage source is higher than the second voltage source. The pixel cell operates by returning a potential on the photo-conversion device to a value approximately equal to a value of a potential barrier between the photo-conversion device and the floating diffusion region prior to generating charge in the photo-conversion device.

12 Claims, 9 Drawing Sheets

LAG CANCELLATION IN CMOS IMAGE SENSORS

FIELD OF THE INVENTION

The present invention relates to the field of semiconductor devices, particularly to an improved image sensor pixel cell and method of operation for reducing lag in the image sensor.

BACKGROUND OF THE INVENTION

CMOS image sensors are increasingly being used as low cost imaging devices. A CMOS image sensor circuit includes a focal plane array of pixel cells, each one of the cells includes a photo-conversion device, such as a pinned photodiode, having an associated a charge accumulation region within a substrate for accumulating photo-generated charge. Each pixel cell may include a transistor for transferring charge from the charge accumulation region to a sensing node, which is typically a floating diffusion region, and a transistor, for resetting the floating diffusion region to a predetermined charge level prior to charge transference. The pixel cell may also include a source follower transistor for receiving and amplifying charge from the sensing node and an access transistor for controlling the readout of the cell contents from the source follower transistor.

CMOS image sensors of the type discussed above are generally known as discussed, for example, in Nixon et al., "256×256 CMOS Active Pixel Sensor Camera-on-a-Chip, "IEEE Journal of Solid-State Circuits, Vol. 31(12), pp. 2046-2050 (1996); and Mendis et al., "CMOS Active Pixel Image Sensors,"IEEE Transactions on Electron Devices, Vol. 41(3), pp. 452-453 (1994). See also U.S. Pat. Nos. 6,177,333 and 6,204,524, assigned to Micron Technology, Inc., which describe operation of conventional CMOS image sensors, the contents of which are incorporated herein by reference.

A schematic diagram of a conventional CMOS pixel cell 10 is shown in FIG. 1. The CMOS pixel cell 10 comprises a pinned photodiode 21 for collecting charges generated by light incident on the pixel, and a transfer transistor 50 for transferring photoelectric charges from the pinned photodiode 21 to a floating diffusion region 25. The floating diffusion region 25 is electrically connected to the gate of an output source follower transistor 60. The pixel cell 10 also includes a reset transistor 40 for resetting the floating diffusion region 25 to a predetermined voltage before sensing a signal, and a row select transistor 80 for outputting a signal from the source follower transistor 60 to an output terminal in response to an address signal.

FIG. 2 is a timing diagram illustrating the operation of the pixel cell 10. In the pixel cell 10, charge is generated by the pinned photodiode 21 in response to light incident on the cell 10 and accumulated by the pinned photodiode 21 during an integration period. During a readout procedure, the photo-generated charge is transferred to readout circuitry and readout as follows.

For readout, a row select signal (ROW) is pulsed high to activate the gate of the row select transistor 80. At approximately the same time, a reset signal (RST) is pulsed high to activate the gate of the reset transistor 40 and to reset the floating diffusion region 25 to a predetermined voltage $V_{pix}$. To obtain a reset signal $V_{rst}$, the voltage on the floating diffusion region 25 is applied to the gate of the source follower transistor 60 and readout through the row select transistor 80 to a sample and hold circuit (not shown). For this operation, as RST goes low, a sample and hold reset signal (SHR) is pulsed high and then low to cause the sample and hold circuit to sample and store the reset signal $V_{rst}$.

Subsequently, the photo-generated charge is readout to obtain a pixel signal $V_{photo}$. For this, a transfer signal (TX) is pulsed high to operate a gate of the transfer transistor 50 and to transfer the photo-generated charge from the pinned photodiode 21 to the floating diffusion region 25. The voltage on the floating diffusion region 25 is applied to the gate of the source follower transistor 60 and readout through the row select transistor 80 to the sample and hold circuit. As TX goes low, a sample and hold signal pixel signal (SHS) is pulsed high and then low to cause the sample and hold circuit to sample and store the pixel signal $V_{photo}$. After the readout process is complete, ROW goes low to deactivate the gate of the row select transistor 80.

A potential barrier may exist between the pinned photodiode 21 and the floating diffusion region 25. FIG. 3 is a potential well diagram of the pinned photodiode 21 and the floating diffusion region 25 and shows a potential barrier 30 between the pinned photodiode 21 and the floating diffusion region 25. This barrier 30 causes incomplete charge transfer and makes the pinned photodiode potential behind the barrier difficult to control. Additionally, this potential barrier 30 leads to image lag.

Image lag includes two components: charging lag and discharging lag. Charging lag is most apparent when a pixel cell has been functioning for a time under dark conditions. FIGS. 4A-4D are potential well diagrams of the pinned photodiode 21 and the floating diffusion region 25 illustrating charging lag. Initially, as shown in FIG. 4A, the potential well of the pinned photodiode 21 is filled with charge (i.e. electrons) to a point below the barrier 30 and the potential of the pinned photodiode 21 is approximately equal to the barrier potential.

During operation in dark conditions, when the transfer gate periodically opens, the potential well of the pinned photodiode 21 becomes partially depleted, as shown in FIG. 4B, and the potential of the pinned photodiode 21 increases. As shown in FIG. 4C, when the pixel cell 10 subsequently integrates light, a portion of the charge 31 generated from that light serves to replenish the depleted potential of the photodiode 21. Accordingly, as shown in FIG. 4D, when the photo-generated charge is transferred to the floating diffusion region 25, the portion of photo-generated charge 31 is prevented from being transferred by the barrier 30 and the charge 31 remains in the pinned photodiode 21 so that the potential of pinned photodiode 21 is again equal to the potential barrier 30.

Consequently, the portion of photo-generated charge 31 is lost and is not readout as part of a pixel image signal. The longer the pixel cell 10 operates under dark conditions, the more depleted the potential well of the photodiode 21 becomes and, therefore, the greater the loss of charge from a first integration period. Charging lag causes non-linearity of signal response, referred to as a "dead" zone with low responsivity at small exposures, and smearing of moving objects.

Discharging lag is associated with a signal from a prior frame appearing as a ghost image in subsequent frames. Discharging lag is likely caused by the potential barrier's 30 dependence on the potential of the floating diffusion region 25 and/or by incomplete charge transfer from the pinned photodiode 21 to the floating diffusion region 25 during a readout cycle. FIGS. 5A through 5D are potential well diagrams of the pinned photodiode 21 and floating diffusion region 25, which illustrate discharging lag As shown in FIG. 5A, initially, the potential barrier 30 has a height $H_1$, when the floating diffusion region 25 has been reset to a predetermined potential, and is free from any photo-generated charge. Also, the potential well of the pinned photodiode 21 is filled with charge to a point below the barrier 30 and the potential of the pinned photodiode 21 is approximately equal to the barrier potential 30. FIG. 5B illustrates the accumulation of photo-generated charge 33 by the photodiode 21.

As the photo-generated charge 33 is transferred to the floating diffusion region 25, the potential on the floating diffusion region 25 decreases and the height of the barrier 30 increases to $H_2$, as shown in FIG. 5C. Consequently, a first portion of photo-generated charge 34 remains in the potential well of pinned photodiode 21, as a second portion of photo-generated charge 35 is transferred to the floating diffusion region 25. As shown in FIG. 5D, when the second portion of photo-generated charge 35 is readout from the floating diffusion region 25, the potential of the floating diffusion region 25 increases and the height of the barrier 30 decreases to $H_3$, which is approximately equal to $H_1$, and the first portion of photo-generated charge 34 is transferred to the floating diffusion region 25. The first portion of photo-generated charge 34 is then readout with subsequently integrated charge, causing a ghost image in the subsequent frame.

Often, techniques to reduce lag result in an undesirable increase in reset noise in a pixel cell. Some techniques, however, have been suggested that provide improved lag characteristics without increasing reset noise. See B. Pain et al., "Analysis and Enhancement of Low-light-level Performance of Photodiode-type CMOS Active Pixel Images Operated With Sub-threshold Reset,"in 1999 IEEE Workshop on CCDs and AIS, (Nagano, Japan), June 1999; H. Tian et al. "Analysis of Temporal Noise CMOS Photodiode Active Pixel Sensor," *IEEEJ. of Solid-State Circuits*, Vol. 36, No. 1, pp. 92-101, (2001), which are incorporated herein by reference. Although these techniques improve lag and reduce reset noise, further noise reduction and alternative methods for reducing lag are needed for CMOS image sensors.

Accordingly, there is a need for a CMOS pixel cell and a method of operating the pixel cell to achieve lag cancellation and reduced reset noise.

BRIEF SUMMARY OF THE INVENTION

Embodiments of the invention provide a pixel cell with improved lag characteristics without increased noise. The pixel cell according to the embodiments of the invention includes a photo-conversion device and a floating diffusion region switchably coupled to the photo-conversion device. The pixel cell includes a reset transistor, which has a first terminal electrically connected to the floating diffusion region and a second terminal switchably coupled to first and second voltage sources. The first voltage source is higher than the second voltage source. The pixel cell operates by returning a potential on the photo-conversion device to a value approximately equal to a value of a potential barrier between the photo-conversion device and the floating diffusion region prior to generating charge in the photo-conversion device, thereby reducing lag without increasing noise.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

Figure 1:
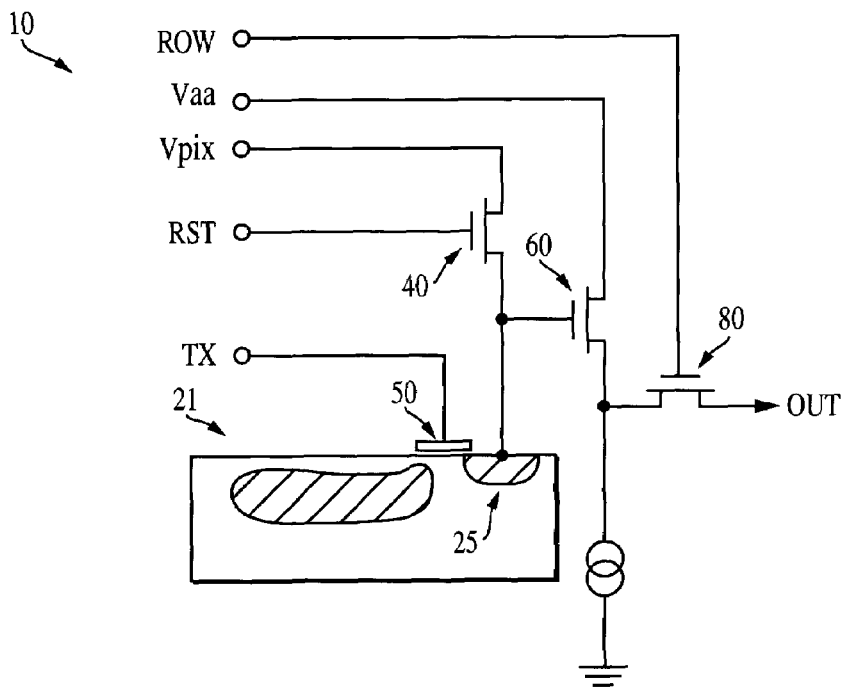
FIG. 1 is a schematic diagram of a conventional CMOS pixel cell.
Figure 2:
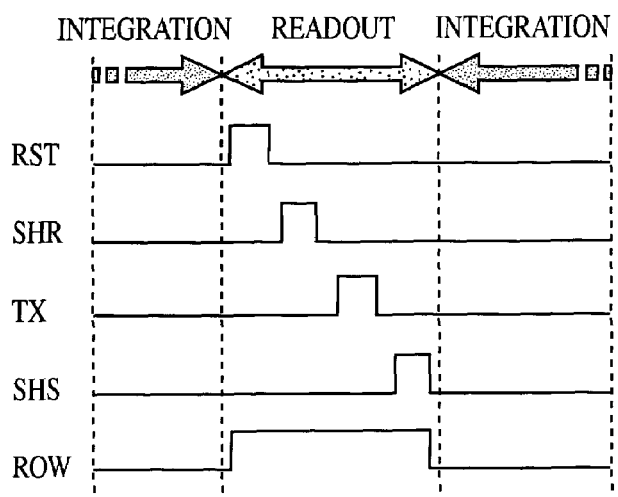
FIG. 2 is a timing diagram illustrating the operation of the pixel cell of FIG. 1.
Figure 3:
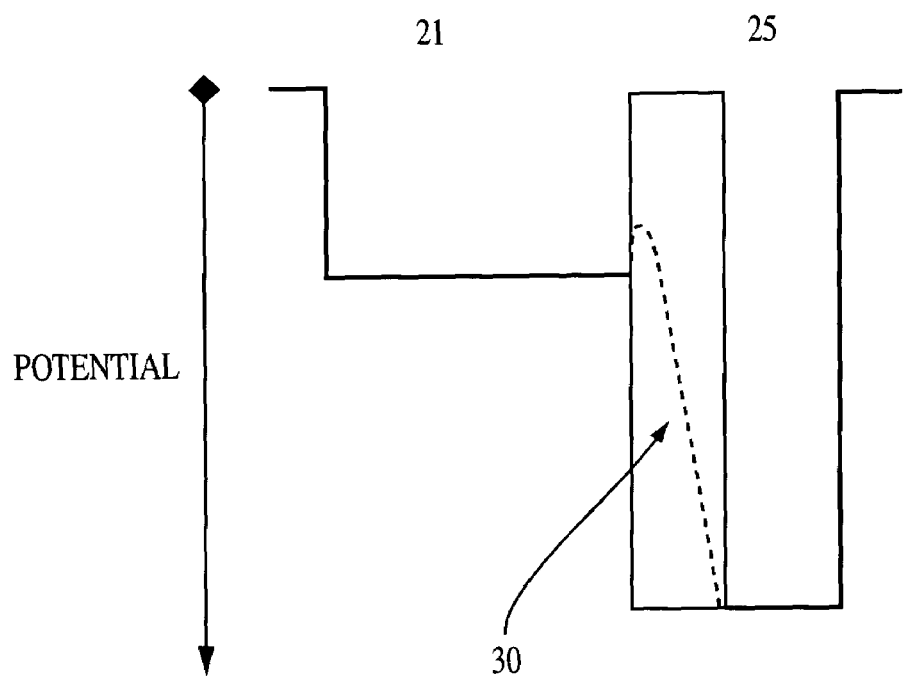
FIG. 3 is a potential well diagram of a portion of the pixel cell of FIG. 1.
Figure 4A:
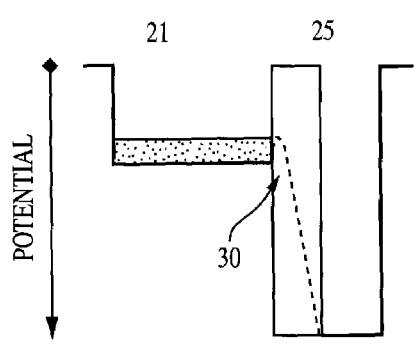
FIGS. 4A-4D are potential well diagrams of a portion of the pixel cell of FIG. 1, which illustrate charging lag.
Figure 4B:
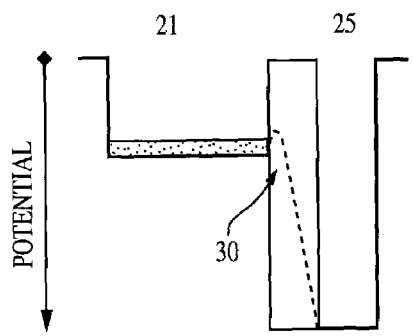
Figure 4C:
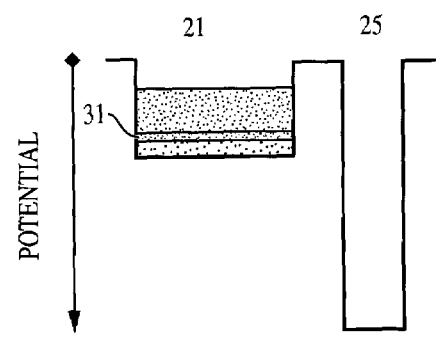
Figure 4D:
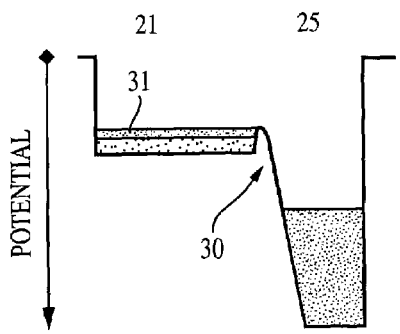
Figure 5A:
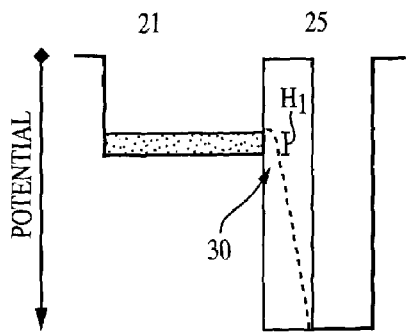
FIGS. 5A-5D are potential well diagrams of a portion of the pixel cell of FIG. 1, which illustrate discharging lag.
Figure 5B:
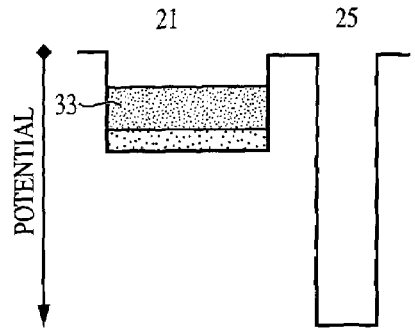
Figure 5C:
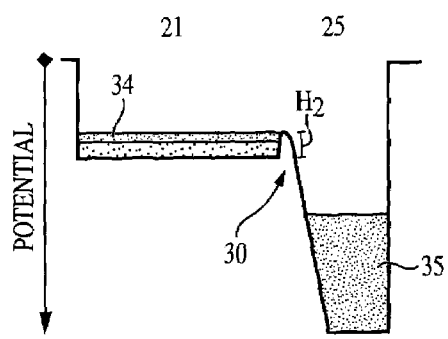
Figure 5D:
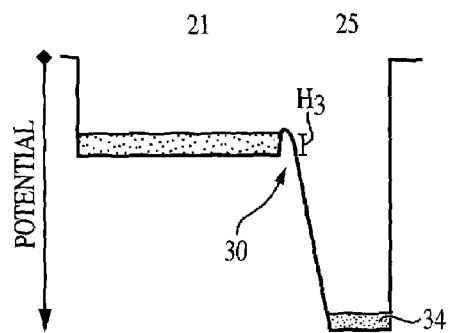

In the following detailed description, reference is made to the accompanying drawings, which form a part hereof and illustrate specific embodiments in which the invention may be practiced. In the drawings, like reference numerals describe substantially similar components throughout the several views. These embodiments are described in sufficient detail to enable those skilled in the art to practice the invention, and it is to be understood that other embodiments may be utilized, and that structural, logical and electrical changes may be made without departing from the spirit and scope of the present invention.

The terms "wafer" and "substrate"are to be understood as including silicon, silicon-on-insulator (SOI), or silicon-on-sapphire (SOS) technology, doped and undoped semiconductors, epitaxial layers of silicon supported by a base semiconductor foundation, and other semiconductor structures, as well as insulating substrates, such as quartz or glass. Furthermore, when reference is made to a "wafer" or "substrate" in the following description, previous process steps may have been utilized to form regions or junctions in the base semiconductor structure or foundation. In addition, the semiconductor need not be silicon-based, but could be based on silicon-germanium, germanium, or gallium-arsenide.

The term "pixel" refers to a picture element unit cell containing a photo-conversion device and other devices for converting electromagnetic radiation to an electrical signal. For purposes of illustration, a representative pixel cell is illustrated in the figures and description herein, and typically fabrication of all pixel cells in an image sensor will proceed simultaneously in a similar fashion.

Figure 6:
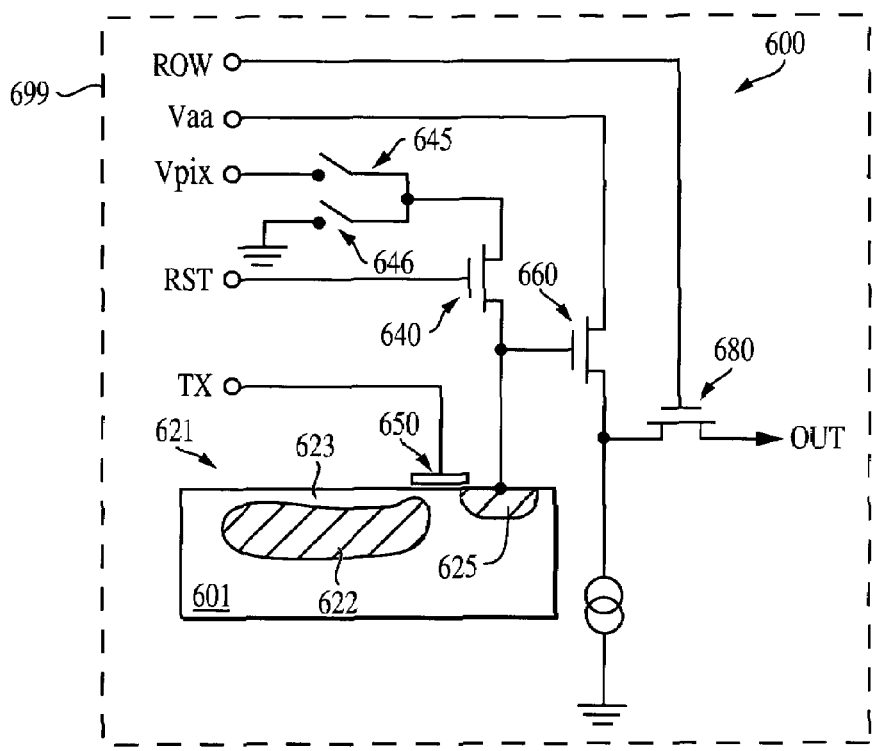
FIG. 6 is a schematic diagram of a pixel cell according to an exemplary embodiment of the invention.

FIG. 6 illustrates a CMOS pixel cell 600 according to an exemplary embodiment of the invention. As shown in FIG. 6, the pixel cell 600 may be included on a semiconductor chip 699 as part of an integrated circuit. It should be appreciated that any pixel cell described hereafter in connection with exemplary embodiments of the invention may be included on semiconductor chip 699 as part of an integrated circuit. For simplicity, only a single pixel cell 600 is depicted as being included on semiconductor chip 699.

Pixel cell 600 comprises a pinned photodiode 621 for collecting charge generated by light incident on the pixel cell 600. As is known in the art, the pinned photodiode 621 can comprise a doped region 622 of a first conductivity type, e.g., n-type, below a surface of a substrate 601, which may be doped to a second conductivity type, e.g., p-type. Over the doped region 622 is a doped surface layer 623 of a second conductivity type, e.g., p-type.

A transfer transistor 650 is electrically connected to the pinned photodiode 621. The transfer transistor 650 receives at its gate transfer signals (TX) that activate the transfer gate to transfer photo-generated charge from the pinned photodiode 621 to a floating diffusion region 625.

The floating diffusion region 625 may be formed as is known in the art as a doped region of a second conductivity type, e.g., n-type, below a surface of the substrate 601. The floating diffusion region 625 is electrically connected to the gate of an output source follower transistor 660 and a reset transistor 640. A source/drain terminal of the source follower transistor 660 is electrically connected to voltage source node $V_{aa}$. A source/drain terminal of the reset transistor 640 is switchably coupled to a low voltage source node, illustratively a ground potential, and a higher voltage source node $V_{pix}$ by switches 646 and 645, respectively.

The switches 645 and 646 can be any circuit or device for switching as are known in the art, e.g., transistors, and can be operated to achieve the features of the present invention. Illustratively, both switches 645, 646 are located within pixel cell 600. Alternatively, one or both of switches 645, 646 can be located outside pixel cell 600 and serve all pixel cells in a same column of an array. As another alternative, one or both of switches 645, 646 can be located outside pixel cell 600 and serve all pixel cells of an array.

The first switch 645 controls the electrical connection of the reset transistor 640 to the higher voltage source node $V_{pix}$. The second switch 646 controls the electrical connection of the reset transistor 640 to the lower voltage source node, which can be ground. The voltage source electrically connected to the reset transistor 640 (lower or higher voltage sources depending upon the state of the switches 645, 646) is applied to the floating diffusion region 625 when a reset signal (RST) is applied to activate the reset transistor 660.

The pixel cell 600 can also include a row select transistor 680 for outputting a signal from the source follower transistor 660 to an output terminal in response to a row select signal (ROW) applied to the gate of the row select transistor 680.

Figure 7:
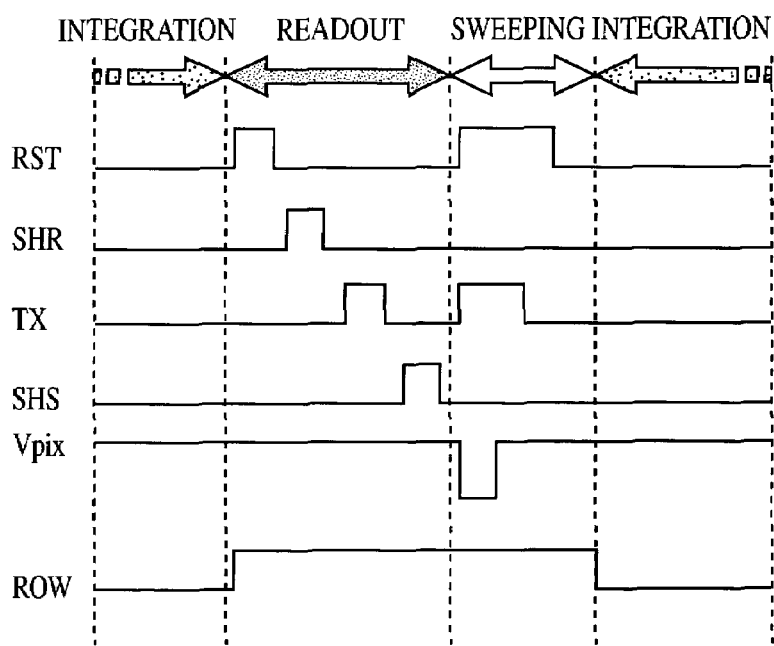
FIG. 7 is a timing diagram illustrating the operation of the pixel cell of FIG. 6 according to an exemplary embodiment of the invention.

FIG. 7 is a timing diagram illustrating the operation of the pixel cell 600 according to an exemplary embodiment of the invention. The operation of the pixel cell 600 includes an integration period, a readout procedure, and a sweeping procedure. FIGS. 8A-8D are potential well diagrams of the pinned photodiode 621 and the floating diffusion region 625, and illustrate the sweeping procedure.

Figure 8A:
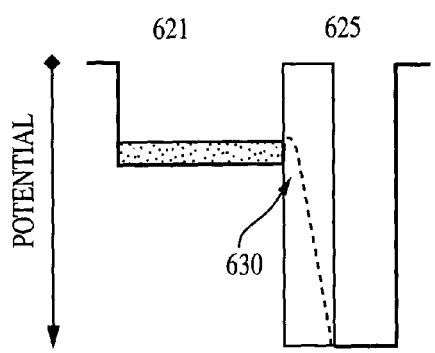
FIGS. 8A-8D are potential well diagrams of a portion of the pixel cell of FIG. 6, which illustrate the operation of the cell according to the timing of FIG. 7.
Figure 8B:
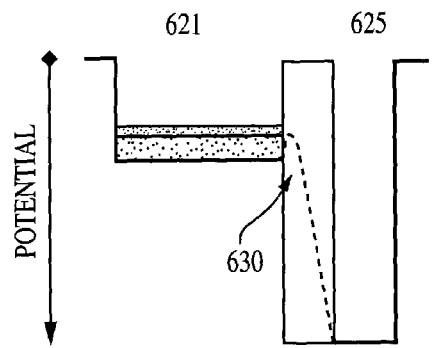

Prior to each new integration period, a sweeping procedure is conducted. The sweeping procedure serves to restore the potential on the pinned photodiode 621 to a reproducible initial potential approximately equal to the barrier potential to eliminate both charging and discharging lag. After an integration period, the potential on the pinned photodiode 610 may be greater than or less than that of the barrier potential 630. FIG. 8A shows the pixel cell 600 after an integration period under dark conditions, which would lead to charging lag in a convention pixel cell 10 (FIG. 1). FIG. 8B shows the pixel cell 600 after an integration period under light conditions, which would lead to discharging lag in a conventional pixel cell 10.

Figure 8C:
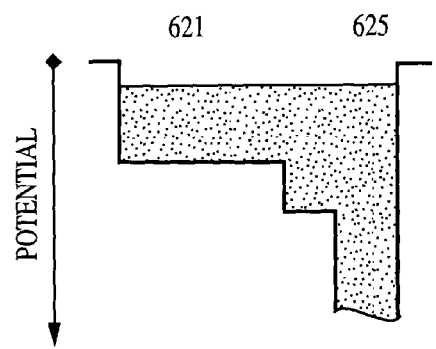

As shown in FIG. 7, to begin the sweeping procedure, a reset signal (RST) and a transfer signal (TX) are pulsed high to activate the reset transistor 640 and the transfer transistor 650, respectively. With the RST and TX signals high, the reset transistor 640 is briefly connected to ground via switch 646 effectively causing $V_{pix}$ to go low. As such, the pinned photodiode 621 and the floating diffusion region 625 are also connected to ground. This fills the potential wells of the floating diffusion region 625 and the pinned photodiode 621 with charge, reducing the potential on the pinned photodiode 621 and the floating diffusion region 625, as illustrated in FIG. 8C. Switch 646 is then opened to disconnect the source/drain terminal of reset transistor 640 from ground.

Figure 8D:
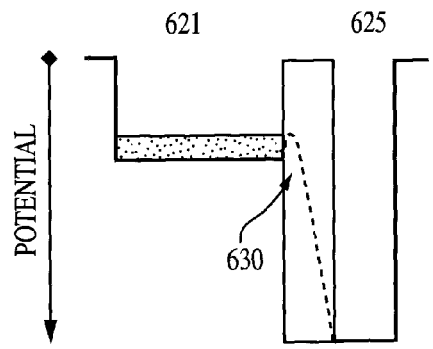

When switch 645 closes, the source/drain terminal of reset transistor 640 is connected to $V_{pix}$ (illustrated in FIG. 7 by $V_{pix}$ going high once again). As RST and TX are still high, the voltage $V_{pix}$ is also applied to the floating diffusion region 625 and pinned photodiode 621. This sweeps the charge from the floating diffusion region 625 and pinned photodiode 621. Because the potential barrier 630 prevents a portion of the charge from being swept from pinned photodiode 621, the pinned photodiode 621 returns to a condition where the potential on the pinned photodiode 621 is approximately equal to the barrier potential 630, as illustrated in FIG. 8D. Also, the floating diffusion region 625 is restored to a predetermined voltage $V_{pix}$. In this manner, charging and discharging lag are cancelled without an increase in noise.

As shown in FIG. 7, after the sweeping procedure, the pixel cell 600 integrates charge. During the integration period, charge is generated by the pinned photodiode 621 in response to light incident on the pixel cell 600 and accumulated by the pinned photodiode 621. After the integration period the charge generated and accumulated by the pinned photodiode 621 is readout during a readout procedure, which may be a same readout procedure as used to readout conventional pixel cell 10 (FIG. 1). However, because a sweeping procedure is conducted prior to charge integration, the pixel cell 600 may be readout without the effects of charging and/or discharging lag.

Figure 10:
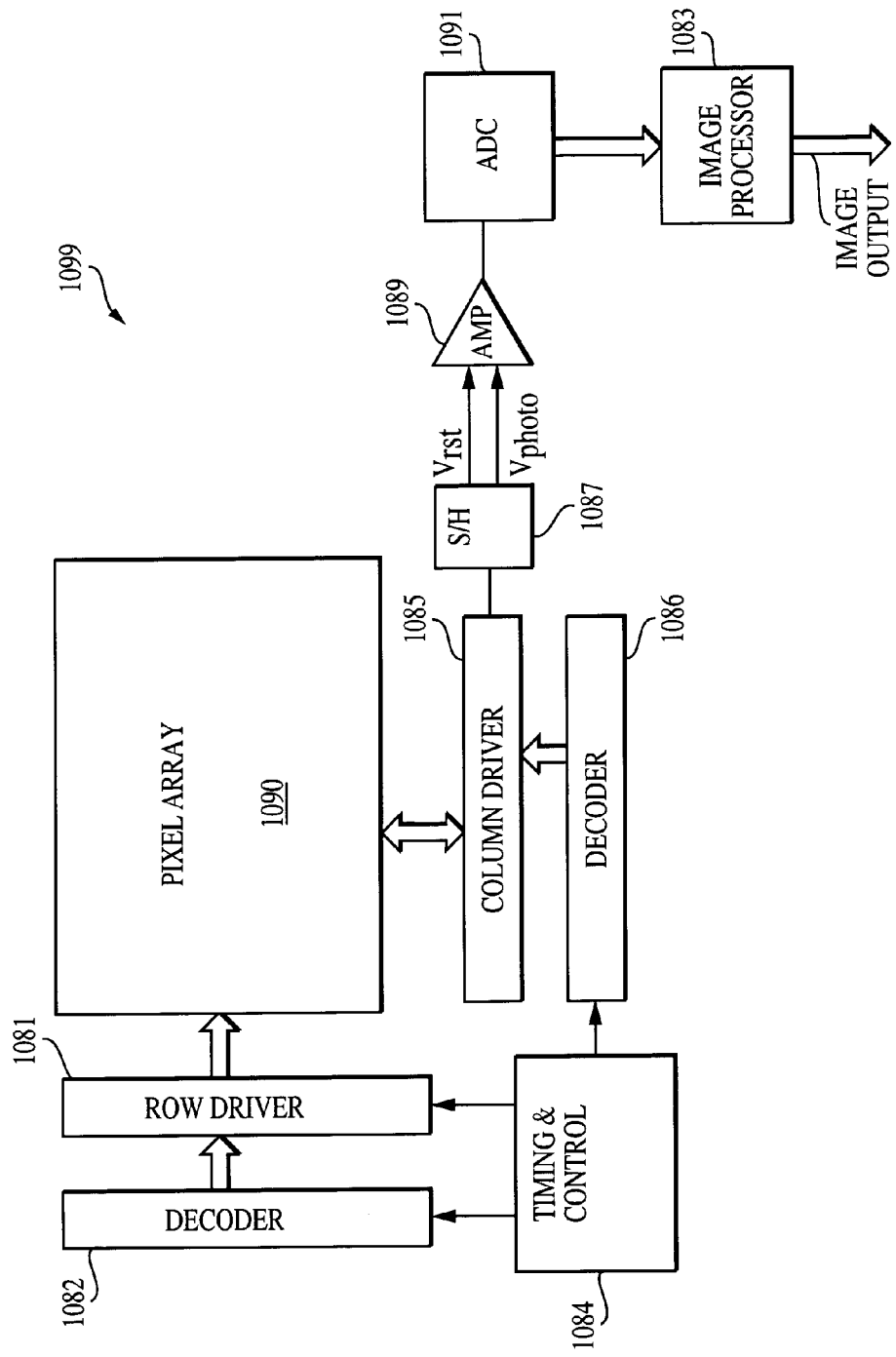
FIG. 10 is a block diagram of an exemplary CMOS image sensor according to another exemplary embodiment of the invention.

The readout procedure is conducted as follows. A row select signal (ROW) is pulsed high to activate the row select transistor 680. At approximately the same time, RST is pulsed high to activate the reset transistor 640 to reset the floating diffusion region 625 to a predetermined voltage $V_{pix}$ since switch 645 is closed. To obtain a reset signal $V_{rst}$, the voltage on the floating diffusion region 625 is applied to the gate of the source follower transistor 660 and readout through the row select transistor 680 to a sample and hold circuit 1087 (FIG. 10). For this operation, as RST goes low, a sample and hold reset signal (SHR) is pulsed high and then low to cause the sample and hold circuit to sample and store the reset signal $V_{rst}$.

Subsequently, the photo-generated charge is readout to obtain a pixel signal $V_{photo}$. For this, TX is pulsed high to operate a gate of the transfer transistor 660 and to transfer the photo-generated charge from the pinned photodiode 621 to the floating diffusion region 625. The voltage on the floating diffusion region is applied to the gate of the source follower transistor 660 and readout through the row select transistor 680 to the sample and hold circuit 1087. As TX goes low, a sample and hold pixel signal (SHS) is pulsed high and then low to cause the sample and hold circuit to sample and store the pixel signal $V_{photo}$. After the readout process is complete, ROW goes low to deactivate the gate of the row select transistor 680.

Figure 9:
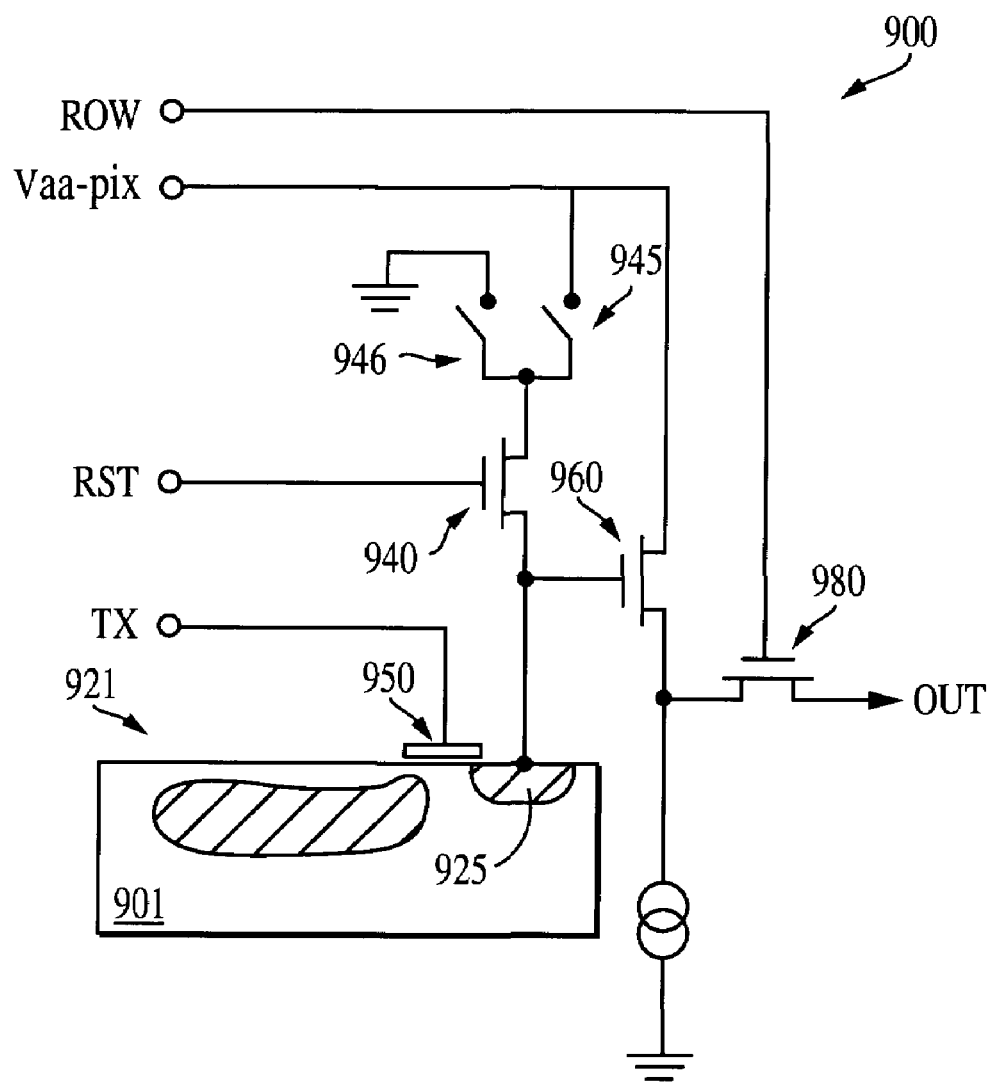
FIG. 9 is a schematic diagram of a pixel cell according to an exemplary embodiment of the invention.

In another embodiment, the $V_{aa}$ and $V_{pix}$ nodes may be combined as an array-pixel voltage $V_{aa-pix}$ node, as shown in FIG. 9. In such a case, the pixel cell 900 would operate similarly to pixel cell 600 described above in connection with FIGS. 6-8D, except that the array-pixel voltage $V_{aa-pix}$ signal would be switched in and/or out by switches 945 and 946.

Although the invention is described in connection with a four-transistor (4T) pixel cell, the invention may also be implemented in other CMOS pixel cell designs or other circuits. Without being limiting, such a design may include a five-transistor (5T) cell or a six-transistor (6T) cell. Five-transistor and 6T cells differ from the 4T cell by the addition of a transistor(s), such as a shutter transistor or an anti-blooming transistor.

While the above embodiments are described in connection with the formation of p-n-p-type photodiodes the invention is not limited to these embodiments. The invention also has applicability to photodiodes formed from n-p-n regions in a substrate. If an n-p-n-type photodiode is formed the dopant and conductivity types of all structures would change accordingly.

FIG. 10 is a block diagram of an exemplary CMOS image sensor 1099 according to an embodiment of the invention. The image sensor 1099 has a pixel array 1090 containing a plurality of pixel cells arranged in rows and columns. The array 1090 may include pixel cells 600 or 900 as described above in connection with FIGS. 6-9.

The pixels of each row in array 1090 are all turned on at the same time by a row select line, and the pixels of each column are selectively output by respective column select lines. The row lines are selectively activated by a row driver 1081 in response to row address decoder 1082. The column select lines are selectively activated by a column driver 1085 in response to column address decoder 1086. The pixel array 1090 is operated by the timing and control circuit 1084, which controls address decoders 1082, 1086 for selecting the appropriate row and column lines for pixel signal readout. The pixel column signals, which typically include a pixel reset signal ($V_{rst}$) and a pixel image signal ($V_{photo}$), are read by a sample and hold circuit (S/H) 1087 associated with the column driver 1085. A differential signal ($V_{rst}$-$V_{photo}$) is produced by differential amplifier (AMP) 1089 for each pixel which is amplified and digitized by analog-to-digital converter (ADC) 1091. The analog to digital converter 1091 supplies the digitized pixel signals to an image processor 1083 which forms a digital image.

Figure 11:
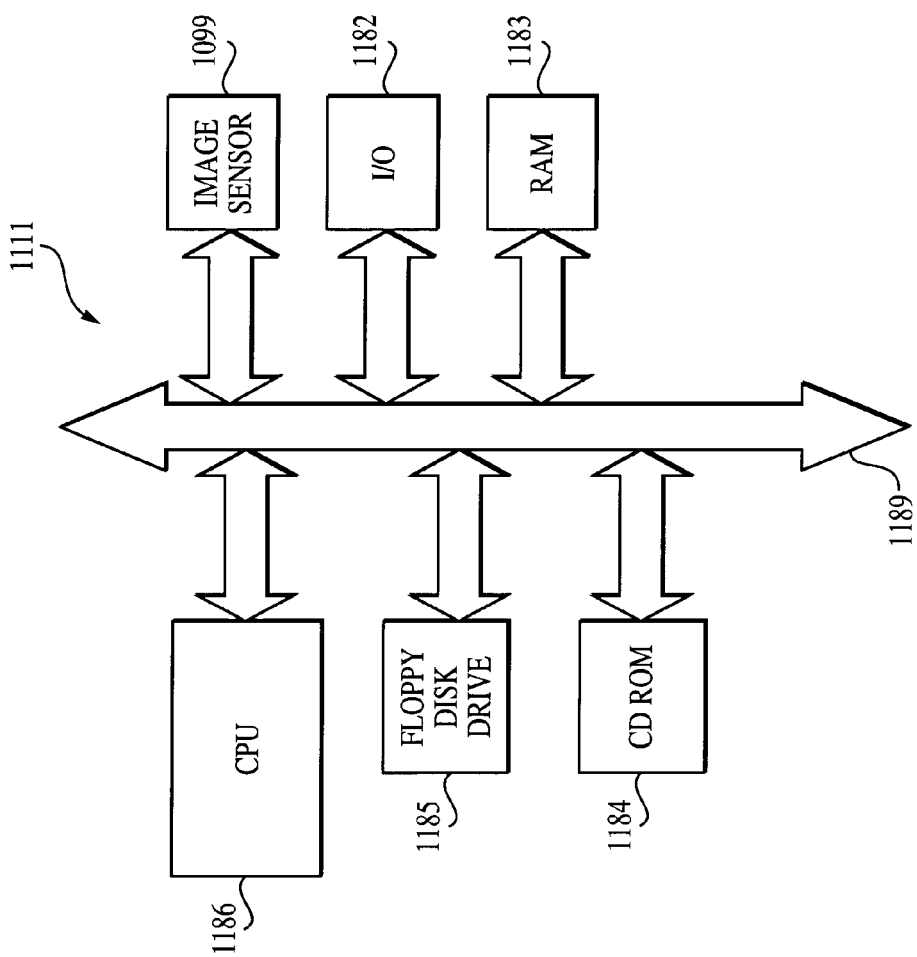
FIG. 11 is a processor-based system implementing the CMOS image sensor of FIG. 10.

FIG. 11 illustrates a processor-based system 1111 including the image sensor 1099 of FIG. 10. Processor-based system 1111 is exemplary of a system having digital circuits that could include CMOS image sensor devices. Without being limiting, such a system could include a computer system, camera system, scanner, machine vision, vehicle navigation, video phone, surveillance system, auto focus system, star tracker system, motion detection system, image stabilization system, and data compression system.

Processor-based system 1111, for example a computer system, generally comprises a central processing unit (CPU) 1186, such as a microprocessor, that communicates with an input/output (I/O) device 1182 over a bus 1189. Image sensor 1099 also communicates with the CPU 1186 over bus 1189. The processor-based system 1111 also includes random access memory (RAM) 1183, and may include peripheral devices, such as a floppy disk drive 1185 and a compact disk (CD) ROM drive 1184, which also communicate with CPU 1186 over the bus 1189. Image sensor 1099 may be combined with a processor, such as a CPU, digital signal processor, or microprocessor, with or without memory storage on a single integrated circuit or on a different chip than the processor.

It is again noted that the above description and drawings are exemplary and illustrate preferred embodiments that achieve the objects, features and advantages of the present invention. It is not intended that the present invention be limited to the illustrated embodiments. Any modification of the present invention which comes within the spirit and scope of the following claims should be considered part of the present invention. Accordingly, the invention is not limited by the foregoing description or drawings, but is only limited by the scope of the appended claims.

What is claimed as new and desired to be protected by Letters Patent of the United States is:

1. A method of operating a pixel cell, the method comprising:
   setting a potential on a photo-conversion device to a value approximately equal to a value of a potential barrier formed between the photo-conversion device and a floating diffusion region prior to generating charge in the photo-conversion device by applying a first potential to the photo-conversion device and the floating diffusion region which fills the photo-conversion device and the floating diffusion with charge and applying a second potential to the photo-conversion device and the floating diffusion region which removes charge from the photo-conversion device and the floating diffusion region, wherein the first potential is lower than the second potential;
   generating charge in response to light incident on the photo-conversion device;
   applying a third potential to the floating diffusion region;
   reading out the third potential from the floating diffusion region; and
   transferring the generated charge from the photo-conversion device to the floating diffusion region subsequent to reading out the third potential.

2. The method of claim 1, wherein the act of setting the potential on the photo-conversion device comprises setting the potential on a pinned photodiode.

3. The method of claim 1, wherein the act of applying the first potential comprises applying a ground potential.

4. The method of claim 1, wherein the act of applying the first potential comprises closing a first switch electrically connected to the first potential, and wherein the act of applying the second potential comprises closing a second switch electrically connected to the second potential.

5. A method of operating a pixel cell, the method comprising:
   applying a first potential to a photo-conversion device and a floating diffusion region which fills the photo-conversion device and the floating diffusion with charge;
   applying a second potential to the photo-conversion device and the floating diffusion region which removes charge from the photo-conversion device and the floating diffusion region;
   wherein the first potential is lower than the second potential;
   generating charge in response to light incident on the photo-conversion device during an integration period;
   after the integration period, applying a third potential to the floating diffusion region;
   reading out the third potential from the floating diffusion region; and
   transferring the photo-generated charge from the photo-conversion device to the floating diffusion region subsequent to reading out the third potential; and
   reading out the photo-generated charge from the floating diffusion region.

6. The method of claim 5, wherein the act of applying the first potential comprises closing a first switch electrically connected to the first potential, and wherein the act of applying the second potential comprises closing a second switch electrically connected to the second potential.

7. The method of claim 5, wherein the act of applying the first potential comprises applying a ground potential.

8. The method of claim 5, wherein the act of applying the first potential comprises applying the first potential to a pinned photodiode.

9. A method of operating an image sensor comprising an array of pixel cells, the method comprising:
   applying a first potential to a photo-conversion device in each pixel cell and a floating diffusion region which fills the photo-conversion device and the floating diffusion with charge in each pixel cell;
   applying a second potential to the photo-conversion device in each pixel cell and the floating diffusion region in each pixel cell which removes charge from the photo-conversion device and the floating diffusion region, wherein the first potential is lower than the second potential;
   in each pixel cell, generating charge in response to light incident on the photo-conversion device during an integration period;
   after the integration period, applying a third potential to the floating diffusion region in each pixel cell; and
   reading out the third potential from the floating diffusion region in each pixel cell.

10. The method of claim 9, wherein the act of applying the first potential comprises closing a first switch electrically connected to the first potential, and wherein the act of applying the second potential comprises closing a second switch electrically connected to the second potential.

11. The method of claim 9, wherein the act of applying the first potential comprises applying a ground potential.

12. The method of claim 9, wherein the act of applying the first potential comprises applying the first potential to a pinned photodiode.

* * * * *